Figure 8:
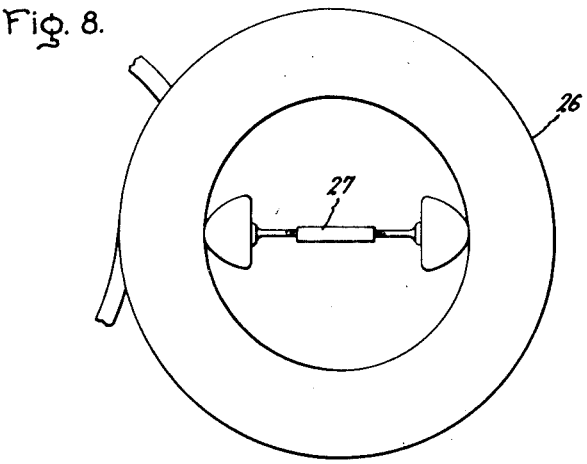

Oct. 9, 1951  E. J. FLYNN ET AL  2,570,786
METHOD OF MAKING DYNAMOELECTRIC MACHINE WINDINGS
Filed May 29, 1948  3 Sheets-Sheet 1
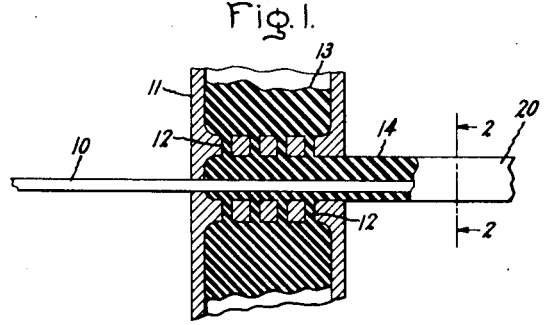
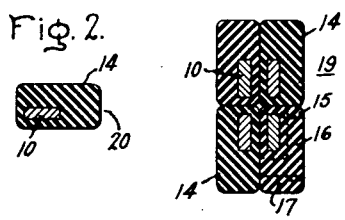
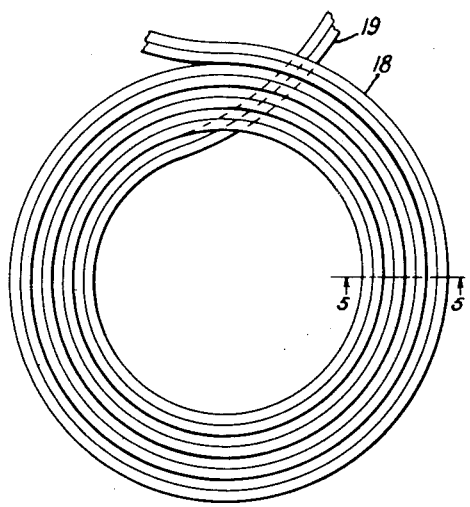
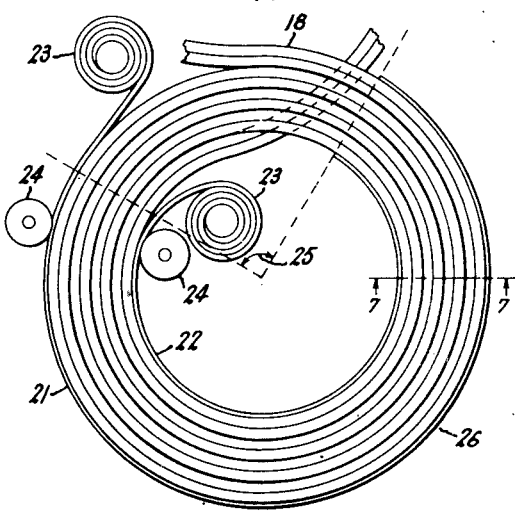
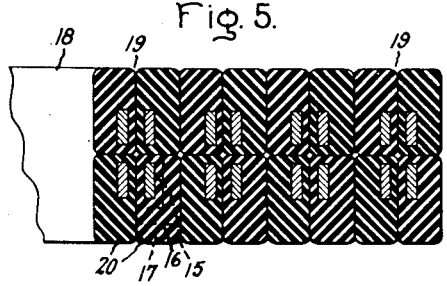
Inventors:
Edward J. Flynn,
Charles E. Kilbourne,
by Prowell S. Mack
Their Attorney.

Oct. 9, 1951   E. J. FLYNN ET AL   2,570,786
METHOD OF MAKING DYNAMOELECTRIC MACHINE WINDINGS
Filed May 29, 1948   3 Sheets-Sheet 2

Inventors:
Edward J. Flynn,
Charles E. Kilbourne,
by Prowell & Mack
Their Attorney.

Oct. 9, 1951 E. J. FLYNN ET AL 2,570,786
METHOD OF MAKING DYNAMOELECTRIC MACHINE WINDINGS
Filed May 29, 1948 3 Sheets-Sheet 3
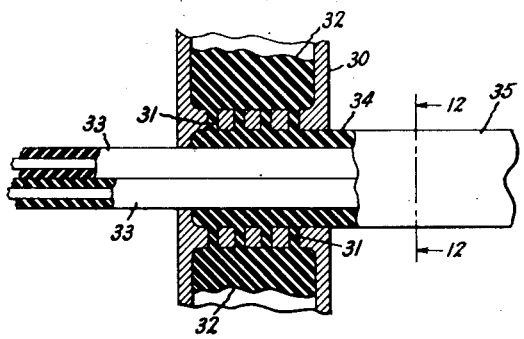
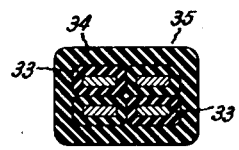
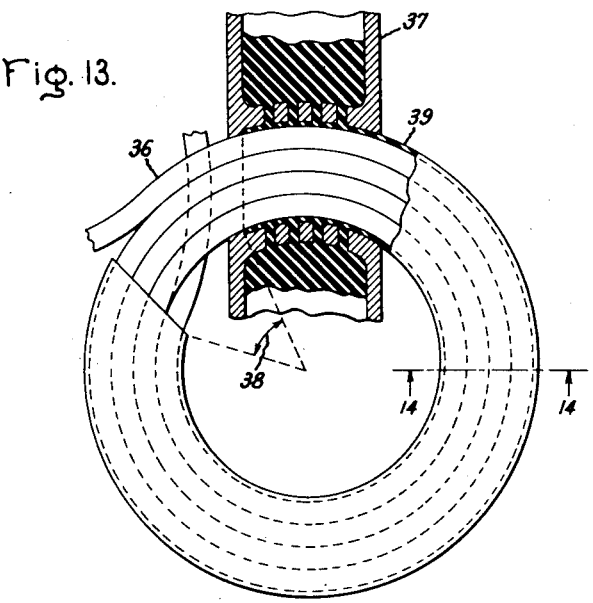
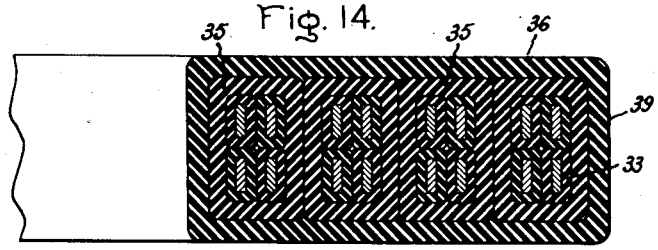
Inventors:
Edward J. Flynn,
Charles E. Kilbourne,
by *Browell S. Mack*
Their Attorney.

Patented Oct. 9, 1951

2,570,786

UNITED STATES PATENT OFFICE 2,570,786

METHOD OF MAKING DYNAMOELECTRIC MACHINE WINDINGS

Edward J. Flynn and Charles E. Kilbourne, Schenectady, N. Y., assignors to General Electric Company, a corporation of New York Application May 29, 1948, Serial No. 30,146

5 Claims. (Cl. 154—80)

Our invention relates to methods for making dynamoelectric machine insulated windings.

Windings such as those used in a slotted rotor or slotted stator core portion of a dynamoelectric machine, are often made up of insulated coils each comprising a number of single strands wound in parallel to compose a turn, with a number of turn sides placed one on the other to form a single tier, and several tiers placed side by side to form a coil side intended to occupy a single slot. Heretofore, the insulation of such an assembly has consisted of insulation around the individual strands or conductors, additional insulation around the turns, still further insulation around the tiers, and additional coil or slot lining insulation wrapped around the several tiers occupying the same slot. Requisite steps in the manufacture of such a coil heretofore have included first applying insulation, such as yarn or varnish to the individual strands, then applying insulation such as yarn, paper, or mica to the turns, then applying insulation such as treated paper, glass tape or glass cloth to the tiers and then applying the outside coil insulation such as varnished cloth sheet, or tape, or other materials. A great many of these steps must be done by hand especially when production schedules are such that a relatively small number of similar machines are being made at any one time. This procedure is very costly. In addition, various other steps not described above are usually required, such as those necessary to further treat the various insulations as by the use of varnish dippings or baking cycles in ovens.

It is an object of the present invention to provide simple and inexpensive means obviating many of the above steps.

It is a further object of this invention to provide methods of making a dynamoelectric machine coil characterized by having an insulation which is more homogeneous and requires less labor to apply than that existing in present constructions.

It is a still further object of the present invention to provide improved methods of making a coil such as a dynamoelectric machine winding.

Broadly the means employed in the embodiments herein illustrated and described comprises methods of making armature coils made up of individual conductors having extruded plastic insulation between the turns, between the tiers, or around the outside of the coil. One feature of novelty is a conductor having an offset extruded insulation so that the insulation on one side of the conductor is greater than that on an opposite side and, consequently, the same insulation may serve two purposes acting, for example, as both strand and turn insulation. This results in the elimination of a large part of previously required labor of applying insulation to the strands, turns, and tiers of the coils.

Figure 9:
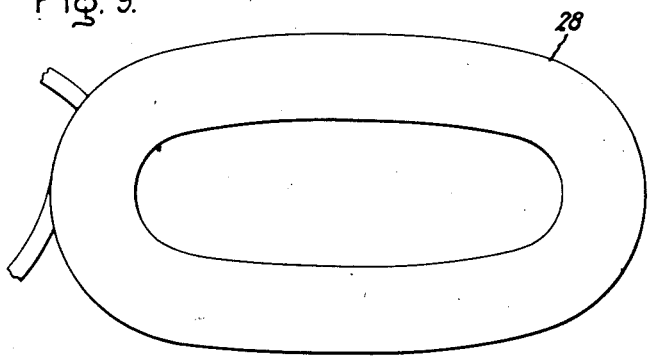
Figure 10:
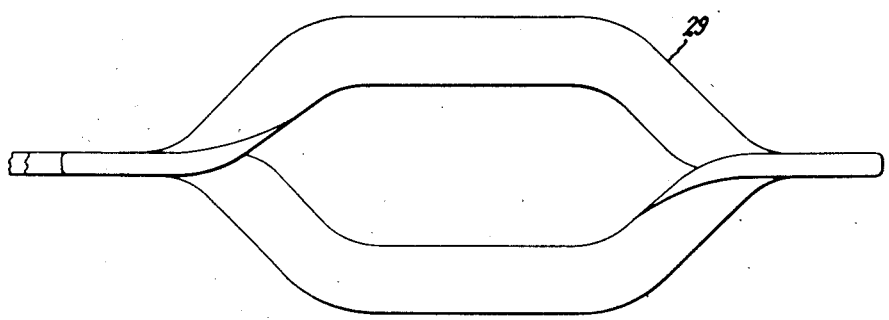

Other objects and advantages will become apparent and our invention will be better understood by reference to the following description taken in connection with the accompanying drawing in which Fig. 1 is a diagrammatic view of a single strand or conductor being insulated in an insulation extruding head; Fig. 2 is a cross-sectional view of the resultant insulated conductor of Fig. 1; Fig. 3 is a cross-sectional view of a turn composed of four of such insulated conductors; Fig. 4 is a top view of a coil made up of such a "turn" wound spirally into a coil of four turns; Fig. 5 is an enlarged cross-sectional view of a portion of the coil of Fig. 4; Fig. 6 is a view showing top and bottom slot insulation being applied to the coil of Fig. 4; Fig. 7 is an enlarged cross-sectional view of a portion of the coil of Fig. 6; Fig. 8 is a view of the completed coil of Fig. 7 ready to be drawn into oval shape; Fig. 9 is the resultant oval coil; Fig. 10 is the final coil as formed ready for insertion into winding slots of a dynamoelectric machine; Fig. 11 shows a group of four pre-insulated strands being passed through an extrusion head to cover the group with turn insulation; Fig. 12 is a cross sectional view of the insulated "turn" produced in Fig. 11; Fig. 13 is a view showing coil insulation being applied to the outside of a coil made up of the insulated turn of Figs. 11 and 12 wound in several layers to form a circular coil; and Fig. 14 is an enlarged cross-sectional view of a portion of the coil of Fig. 13.

In Fig. 1 we have shown a diagrammatic representation of a bare conductor or strand 10 of copper material being fed through an extrusion head 11 adapted to feed insulation onto the strand. The extrusion head 11 is provided with a plurality of orifices 12 through which insulating material 13 being extruded flows by the application of suitable pressure to the unextruded mass of the material. Various materials may be used for the insulation to be extruded, but it seems essential that the material possess characteristics of toughness and elasticity which will permit considerable deformation without developing harmful dielectric weakness when the desired coil is subsequently formed from the insulated strands. Resinous insulation material capable of being extruded and then deformed without developing mechanical or electrical weaknesses are, for example, synthetic insulating materials of the superpolyamide type, polyester resins (i. e., condensation product of terephthalic acid and ethyleneglycol), copolymers of unsaturated alkyd resins and monomeric materials containing an ethylenic linkage, silicone rubbers, as disclosed and claimed in Patent 2,448,756 issued September 7, 1948, on an application filed by Maynard C. Agens, and assigned to the same assignee as the present invention, polymerized fluorinated unsaturated hydrocarbons (i. e. polymerized tetrafluoroethylene), vinyl halide resins, e. g., polyvinyl chloride, polyvinylidene chloride, etc. Such materials are more elastic and tougher than many dynamoelectric machine coil insulating materials presently used and will permit greater deformation without developing harmful weaknesses. Various modifications of the materials mentioned above are well known to be readily extrudable and sufficiently flexible to be subsequently formed without cracking especially since many of these materials can be chemically, mechanically or thermally treated to produce bonding and sealing.

The strand 10 is assumed to be of rectangular cross-section as shown in Fig. 2, which is a cross-sectional view of the strand together with its extruded insulation as viewed along the line 2—2 of Fig. 1. It will be seen from Figs. 1 and 2 that the extruded insulating material is placed on the conductor or strand to a greater thickness on two adjacent sides of the conductor than on the two sides opposite therefrom.

In Fig. 3 we have shown four strands (each similar to the strand of Fig. 2) placed together to form a group which, for convenience, will be referred to as a "turn" even though the group at this point is straight and uncoiled. In the lower right-hand insulated conductor of the group or turn shown in Fig. 3, dotted lines indicate the portions of the homogeneous insulation which serve as the strand insulation 15, the turn insulation 16 and the coil insulation 17.

Fig. 4 is a top view of a coil 18 made up of a "turn," such as that shown in Fig. 3, spirally wound, as on a mandrel (not shown), into a circular coil of four turns.

Fig. 5 is an enlarged cross-sectional view taken on the line 5—5 of Fig. 4 and showing the four turns 19 each made up of four insulated conductors 20 with the conductor portion thereof offset with respect to the insulation so that the same insulation provides strand insulation 15, turn insulation 16 and coil insulation 17. However, the entire coil (or slot liner) insulation is not provided in this manner because the radially innermost and the radially outermost conductors have only the same insulation as all the other conductors and it is necessary to add additional insulation for the top and the bottom of the slot.

In Fig. 6 we have shown the coil 18 with such top insulation 21 and bottom insulation 22 being applied in strip form from spools 23. The coil is passed through rollers 24, which clamp this top and bottom insulation under heat and pressure to seal the entire insulation into a uniform mass as the coil is rotated by operation of the rollers. A small portion of the coil such as segment 25 not covered (because of interference by the coil leads) can be hand taped later so that the entire coil is properly insulated.

In Fig. 7 we have shown a cross-sectional view taken on the line 7—7 of Fig. 6 and showing the top insulation 21 and the bottom insulation 22 added to the coil 18 of Figs. 4 and 5 to form a completely insulated coil 26. Despite the lines of insulation demarcation shown for the purposes of clarity it will be understood by those skilled in the art that all of the insulation can be, and preferably is, bonded.

In Fig. 8 we have shown the coil 26 with a spreader jack 27 placed therein for the purpose of stretching the coil into an oval shape.

In Fig. 9 the resultant oval coil 28 is shown. By conventional means the coil is then pulled out to its final completed shape as indicated by the coil 29 of Fig. 10.

Another method of taking advantage of the characteristics of the elastic resinous insulating materials mentioned is indicated by Figs. 11–14. In Fig. 11 we have shown in cross section an extrusion head 30 provided with a plurality of orifices 31 and filled with a resinous insulating material 32. A plurality of preinsulated strands 33 are placed in the extrusion head adapted to form on them an outer, or "turn," insulating covering 34. The insulation 33 which is first put on the strands may be extruded thereon in another machine or may be conventional insulation such as cotton, yarn or paper wrapped around the conductor by hand or by machine. A cross section of the completed conductor group 35 taken on the line 12—12 of Fig. 11 is shown in Fig. 12.

Subsequently, the turns made up as shown in Figs. 11 and 12 are wound on a circular bobbin to produce a spiral coil 36 as shown in Fig. 13. The coil is placed in an extrusion head 37 which has an arc-like inner surface so that it is adapted to extrude insulating material which follows the circular contour of the coil as it is rotated by some means (not shown). A small portion of the coil (i. e. the segment marked 38) cannot be insulated in this manner, but may be hand taped later.

In Fig. 14 we have shown an enlarged cross-sectional view of the insulated coil 36 as viewed at the line 14—14 of Fig. 13. It is seen that the four turns 35 which make up the coil 36 are completely surrounded by the extruded insulation 39.

Subsequently, the coil is stretched out into an oval and pulled out to its final form as previously described in connection with Figs. 9 and 10.

In this manner, a large part of the previously required hand or machine insulating of a coil and its components is eliminated and a better finished article is produced in a great deal less time and with a great deal less labor.

While we have illustrated and described particular embodiments of our invention, modifications thereof will occur to those skilled in the art. We desire it to be understood, therefore, that our invention is not to be limited to the particular arrangements disclosed, and we intend in the appended claims to cover all modifications which do not depart from the spirit and scope of our invention.

What we claim as new and desire to secure by Letters Patent of the United States is:

1. The method of making a dynamoelectric machine coil comprising extruding a resinous insulating material on a metallic conductor to a greater depth on two adjacent sides thereof than on the two respectively opposite adjacent sides, grouping together a plurality of such insulated strands, winding the group into a spiral coil, and drawing the spiral coil out into its final form.

2. The method of making a dynamoelectric machine coil comprising grouping a plurality of insulated conductors, spirally winding the group thus formed into an oval-shaped coil, and rotating the circular coil and simultaneously extruding an insulating material over the outer surfaces of said coil.

3. The method of making a dynamoelectric machine coil comprising grouping a plurality of insulated strands in side by side relationship, extruding a synthetic insulation material around the outside of the group, winding the insulated group to produce a spiral coil, rotating the spiral coil and simultaneously extruding insulating material following the circular contour of the coil, stretching said insulated coil into an oval form, and pulling the oval coil out to its final form.

4. The method of making a dynamoelectric machine coil comprising extruding an insulating material on a metallic conductor to a greater depth on two adjacent sides thereof than on the two respectively opposite adjacent sides, grouping four of such insulating conductors with the copper sections centrally located, winding the group to produce a circular coil, applying top and bottom strips of insulation to the coil, subjecting the coil to heat and pressure to seal the insulation into a uniform mass, and pulling the resulting coil into shape.

5. The method of making a dynamoelectric machine coil including extruding a resinous insulating material onto an electric conductor in such manner that said insulation is eccentric with respect to said conductor, winding a plurality of such insulated conductors into a spiral coil and pulling said spiral coil out to its final form.

EDWARD J. FLYNN.
CHARLES E. KILBOURNE.

REFERENCES CITED

The following references are of record in the file of this patent:

UNITED STATES PATENTS

| Number | Name | Date |
|---|---|---|
| 728,183 | Varley | May 12, 1903 |
| 1,046,211 | Milton | Dec. 3, 1912 |
| 1,253,166 | Frank et al. | Jan. 8, 1918 |
| 1,455,188 | Cox | May 15, 1923 |
| 1,874,723 | Dawson, Jr. | Sept. 18, 1931 |
| 2,089,817 | Stutsman | Aug. 10, 1937 |
| 2,135,315 | Walters et al. | Nov. 1, 1938 |
| 2,282,759 | Gavitt | May 12, 1942 |
| 2,438,956 | Warner | Apr. 6, 1948 |
| 2,489,867 | D'Orio | Nov. 29, 1949 |